(12) United States Patent
Greenberg et al.

(10) Patent No.: US 6,372,826 B1
(45) Date of Patent: Apr. 16, 2002

(54) CURABLE COMPOSITION COMPRISING EPOXY RESIN, GRAPHITE POWDER AND POLYTETRAFLUOROETHYLENE POWDER

(75) Inventors: Glen R. Greenberg, Avon; Robert M. Richardello, Windsor, both of CT (US); Richard L. Frentzel, Chino Hills, CA (US)

(73) Assignee: Turbine Controls, Inc., Bloomfield, CT (US)

( * ) Notice: Subject to any disclaimer, the term of this patent is extended or adjusted under 35 U.S.C. 154(b) by 0 days.

(21) Appl. No.: 08/568,114

(22) Filed: Dec. 6, 1995

(51) Int. Cl.$^7$ .............. C08L 63/02; C08K 3/04; C08K 3/08; C08K 5/10
(52) U.S. Cl. .............. 523/435; 523/455; 523/458; 523/468
(58) Field of Search ................ 523/435, 455, 523/458, 468

(56) References Cited

U.S. PATENT DOCUMENTS

| | | |
|---|---|---|
| RE29,092 E * | 12/1976 | Schiefer et al. ............ 508/106 |
| 4,996,085 A | 2/1991 | Sievers |
| 5,219,956 A * | 6/1993 | Fukuoka ............ 525/526 |
| 5,316,790 A | 5/1994 | Chan et al. |
| 5,344,515 A | 9/1994 | Chenock, Jr. |

OTHER PUBLICATIONS

Dexter Corporation Product Technical Information Sheet, HYSOL solder resist SR1000 Jul. 15, 1994.
Dexter Corporation Material Safety Data Sheet (MSDS), HYSOL SR1000.

* cited by examiner

*Primary Examiner*—D. R. Wilson
(74) *Attorney, Agent, or Firm*—William A. Simons; Wiggin & Dana

(57) ABSTRACT

A curable composition useful for repairing worn surfaces on housings comprising an admixture of:

(1) a mixture of (a) an one-component epoxy resin, (b) solvent and (c) reactive diluent, wherein said epoxy resin is present in a major amount in said mixture;

(2) graphite powder; and (3) polytetrafluoroethylene powder.

5 Claims, No Drawings

CURABLE COMPOSITION COMPRISING EPOXY RESIN, GRAPHITE POWDER AND POLYTETRAFLUOROETHYLENE POWDER

BACKGROUND OF THE INVENTION

1. Field of the Invention

The present invention relates to a housing repair composition comprising a curable admixture of (1) a mixture of an epoxy resin/solvent/reactive diluent; (2) graphite powder; and (3) polytetrafluoroethylene powder. Moreover, the present invention is directed to a housing structure that has the cured form of the above admixture coated therein or applied into damaged or worn areas of the housing.

2. Brief Description of the Art

Aircraft fuel and oil pump housings requires repair because their gear drive bushings wear away during use. This wear (called "galling" or "scoring" or "gear wiping") limits the longevity of the pump housing and requires their replacement or their rebuilding.

One method of rebuilding such pump housing is disclosed in U.S. Pat. No. 4,996,085 which issued to Sievers on Feb. 26, 1991. That patent teaches coating the pump housing surfaces to be treated with a composition comprising a hardenable epoxy resin, a reinforcing filler, and an agent having a lower coefficient of friction than the epoxy resin. It is noted col. 2, lines 44–45, suggest that graphite may function as the reinforcing filler. Col. 3, lines 43–54, of the reference also teaches the frictional reducing agent may be graphite, in fibrous or granulated form; fluorinated carbon (i.e., —(CF$_x$)— wherein x<2); or molybdenum disulfide. It is noted that this reference does not provide any further specifics as to the fluorinated carbon materials useful for that invention. It is also noted that the preferred class of epoxy resins in this reference are diglycidyl ether of a dihydric phenol (e.g., the diglycidyl ether of bisphenol A).

A second method of treating such worn pump housing surfaces is disclosed in U.S. Pat. No. 5,316,790 which issued to Chan et al. on May 31, 1994. This patent describes a lubricative coating and filler material for restoring metal surfaces that have scratched, scored, grooved, or otherwise damaged to a functional condition. This coating and filler material is a mixture of an epoxy resin, tungsten disulfide, and isopropyl alcohol in a ratio of 9:1:1.6.

While these coating materials may be satisfactory for certain applications, there is still need for a better pump housing repair composition.

BRIEF SUMMARY OF THE INVENTION

Accordingly, one aspect of the present invention is directed to a curable composition useful for repairing worn surfaces on housings comprising an admixture of:

(1) a mixture of (a) a least one one-component epoxy resin, (b) at least one solvent and (c) at least one reactive diluent, wherein said epoxy resin is present in a major (i.e. at least 50% by weight) amount in said mixture;

(2) graphite powder; and (3) polytetrafluoroethylene powder.

Another aspect of the present invention is directed to a pump structure having the above-noted housing repair composition cured onto worn surfaces of the housing structure.

DETAILED DESCRIPTION OF THE PREFERRED EMBODIMENTS

The preferred housing repair composition of the present invention comprises: (1) about 70% to about 90% by weight (more preferably 75% to about 88% by weight) of HYSOL SR1000 high solids epoxy resin/solvent mixture; (2) about 5% to about 15% by weight (more preferably, about 7% to about 13% by weight) of graphite; and (3) about 1% to about 10% by weight (more preferably, about 3% to about 8% by weight) of polytetrafluoroethylene powder.

HYSOL SR1000 is available from the Dexter Electronic Materials Division of the Dexter Corporation of Industry, Calif. This product contains diethylene glycol monoethyl ether acetate solvent (also known as carbitol acetate) [Chemical Abstract No. 000112152] as a solvent, as well as a bisphenol A epichlorohydrin polymer (a diglycidyl ether of bisphenol A) [Chemical Abstract No. 025068386] as an epoxy resin, and p-tert-butylphenyl glycidyl ether [Chemical Abstract No. 068958225] as a reactive diluent. The epoxy resin portion of this product constitutes a major portion (i.e., greater than 50% by weight) of the product. The epoxy resin used in this product is an one-component coatable-type epoxy resin. The term one-component as used herein means that the epoxy resin is pre-catalyzed and the term coating-type means a type other than adhesive-type epoxy resins. Small amounts of solvent will flash off during the curing process, causing little chance for voids in the rebuilt pump housing surface.

The preferred graphite powder is DCF graphite powder available from Graphite Sales, Inc. of Nova, Ohio.

Polytetrafluoroethylene powder, also known as TEFLON™ powder, is a fluorinated carbon polymer of the formula —(CF$_x$)— where x=2.

The curable composition may also optionally contain color additives, metal powders or both. If it is desirable to use a metal powder, silver powder or copper powder in amounts from about 0.5% to 20% of the curable composition may be used.

The above mentioned three critical materials, as well as the optional ingredients, are preferably mixed together at ambient temperature under a vacuum to remove any air in the resulting paste. The paste may be then applied to either damaged or undamaged surfaces of a pump housing. When applied to the damaged surfaces, the paste acts as a filling and coating to the surface of the pump housing. When applied to the undamaged surfaces, it acts only as a coating to prevent future wear.

After being applied, the paste is cured by heating the paste and the pump housing part to which it is applied to suitable curing temperature for a sufficient amount of time. Suitable curing temperatures are from about 125° to about 200° C. The cured paste may then be machined to form a smooth surface on the pump structure. The curing and machining steps may be repeated several times to ensure that a completely cured and smooth surface results.

Besides its preferred use on pump housings, the curable composition of the present invention may also be used to repair worn housing parts on pistons, gear boxes, cover assemblies, valve bodies, actuators, cylinders, shafts and journals.

The following Examples are provided to better illustrate the present invention. All parts and percentages are be weight and all temperatures are degrees Celsius, unless explicitly stated otherwise.

EXAMPLE 1

Preparation of Repair Composition

In a stainless steel, one-quart canister connectable to a combination vacuum pump/paddle-type mixer (Mode 9 made by Whipmix Corporation of Louisville, Ky., a chilled mixture of two epoxy resins in solvent (HYSOL SR1000—a mixture of bisphenol A epichlorohydrin and p-tert-butylphenyl glycidol ether in diethylene glycol monoethyl ether acetate) was warmed to room temperature (approximately 25–30° C.). A graphite powder (Grade EC-100-DCF) made by Graphite Sales of Nova, Ohio and polytetrafluoroethylene powder (TEFLON MSDS No. TEF017B) made by DuPont of Wilmington, Del., were then added to the canister. The parts by weight of these three ingredients added to the canister were 85 parts HYSOL SR1000, 10 parts graphite powder, and 5 parts of polytetrafluoroethylene.

The vacuum pump and paddle-type mixer then were activated with the filled canister attached thereto. A vacuum (27 inches of Hg) was drawn while the paddles continuously mixed the ingredients for 4 hours. The resulting air-free paste was then evaluated by the following tests:

EXAMPLE 2

Tensile Bond Test

Three separate samples of the paste made by Example 1 were tested by Dirats Laboratories according to- ASTM-C-633-79 (Modified) Test Method at −65° C. These bond tension tests used 100% adhesive coating and an area of 0.599947 and obtained the following results:

| Sample | Rupture Pounds | PSI |
| --- | --- | --- |
| 1 | 3,239 | 5,399 |
| 2 | 3,111 | 5,186 |
| 3 | 3,809 | 5,349 |

These tests indicted that all three samples possessed adequate tensile bond strengths to be useful as a replacement coating for housings.

EXAMPLE 3

Hardness Test

A Rockwell-H Hardness Test was carried out with a sample of the paste made in Example 1 according to ASTM-C-297 test method. The results of this tests was 100.0.

This value indicates that the tested sample possessed sufficient hardness to be useful as a replacement coating for housings.

EXAMPLE 4

Taber Abrasion Test

A sample of the paste made by Example 1 was subject to a Taber Abrasion Test in accordance with ASTM-D-4060. This test was carried out with CS-10 Calibrose wheels, a 1,000 gram load for 1,000 cycles.

The weight loss in milligrams/1,000 cycles was 21.1 milligrams. This value indicates that the sample possessed sufficient abrasion resistance to be useful as a replacement coating for housings.

EXAMPLE 5

Salt Spray Corrosion Test

Two panels, each containing a sample of the paste made by Example 1, were tested in a 240 hour salt spray test in accordance with ASTM-B-117 test method. This test was carried out at a pH of 6.9; temperature of 95° F., specific gravity of 1.035 and FOG COLL. ml./hr. of 1.2.

The two panels showed no evidence of blistering or corrosion after this 240 hour salt spray test. This indicates that the tested sample would have sufficient corrosion resistance to be suitable as a replacement coating for housings.

EXAMPLE 6

The composition of example 1 was applied with a spatula to the worn surfaces of the 5 inner walls of the housings of a 5 stage peerless vertical turbine pump assembly.

The 5 housings, after the composition was applied, were cured for 1 hour at 300 degrees Fahrenheit.

The repaired areas in the housings were then finished by grinding and hand polishing. This fully restored the housing inner diameters to original dimensions.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A curable composition comprising an admixture wherein:
    (1) about 70% to about 90% by weight of said admixture is a mixture comprising:
        (a) an epoxy resin wherein said epoxy resin is a diglycidyl ether of bisphenol A and wherein said epoxy resin is from about 50% to about 90% by weight of said mixture;
        (b) a solvent, wherein said solvent is diethylene glycol monoethyl ether acetate and wherein said solvent is about 5% to about 25% by weight of said mixture;
        (c) a reactive diluent, wherein said reactive diluent is p-tert-butylphenyl glycidyl ether and wherein said reactive diluent is about 5% to about 25% by weight of said mixture;
    (2) about 5% to about 15% by weight of said admixture is graphite powder; and
    (3) about 1% to about 10% of said admixture is polytetrafluoroethylene powder.

2. The curable composition of claim 1 wherein said admixture comprises (1) about 75% to about 88% of said mixture; (2) about 7% to about 13% of said graphite powder; and (3) about 3% to about 8% of said polytetrafluoroethylene powder, all percentages based on the total weight of said admixture.

3. The curable composition of claim 1 wherein said admixture further comprises a metal powder selected from the group consisting of silver powder and copper powder.

4. The curable composition of claim 1 wherein said metal powder is present in an amount from about 0.5% to about 20% by weight of the total admixture.

5. A housing structure having a repaired worn surface wherein said repaired worn surface is prepared by curing said curable composition of claim 1.

* * * * *